2 Sheets—Sheet 1.

J. W. COLLET.
GOVERNOR.

No. 189,193. Patented April 3, 1877.

ATTEST:
Robert Burns.
Le Blond Burdett.

INVENTOR:
John W. Collet
per Knight Bro
attys.

2 Sheets—Sheet 2.

J. W. COLLET.
GOVERNOR.

No. 189,193. Patented April 3, 1877.

ATTEST:
Robert Burns
L. Blond Burdett.

INVENTOR:
John W Collet
per Knight Bros
attys.

UNITED STATES PATENT OFFICE.

JOHN W. COLLET, OF UPPER ALTON, ILLINOIS.

IMPROVEMENT IN GOVERNORS.

Specification forming part of Letters Patent No. 189,193, dated April 3, 1877; application filed February 13, 1877.

*To all whom it may concern:*

Be it known that I, JOHN W. COLLET, of Upper Alton, Madison county, Illinois, have invented a certain new and useful Improvement in Steam-Engine Governors, of which the following is a full, clear, and exact description, reference being had to the accompanying drawing, making part of this specification.

My improvement belongs, in its most perfect form, to that class of governors in which there is a provision for closing the valve on the breakage of the driving-belt.

The main feature of my invention is the connection of the valve-stem lever to one end of a belt whose other end is fixed, and which strap or belt extends beneath a rotating head or wheel, in which are a number of rollers capable of radial movement, and whose pressure upon the belt bears proportion to the speed of rotation of the wheel frame or head, so as to regulate the size of opening of the governor-valve, and consequently the speed of the engine. An adjustable counter-balance weight acts in opposition to the centrifugal force of the rollers aforesaid.

The weighted end of the governor-stem lever is connected by a cord or chain passing over an elevated pulley or pulleys to an arm carrying an idler-pulley that runs on the governor-belt. The arrangement is such that if the governor-belt breaks or runs off the pulleys, the idler descends, and, by drawing on the connecting-cord, lifts up the weighted end of the valve-stem lever, and closes the valve.

Figure 1:
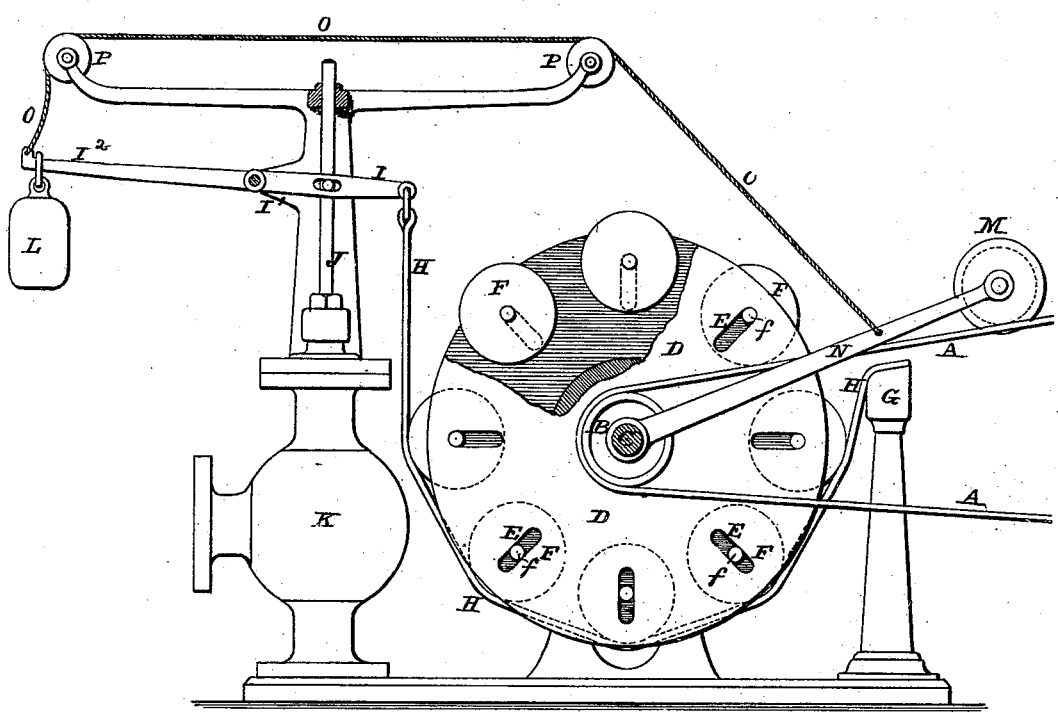
Figure 2:
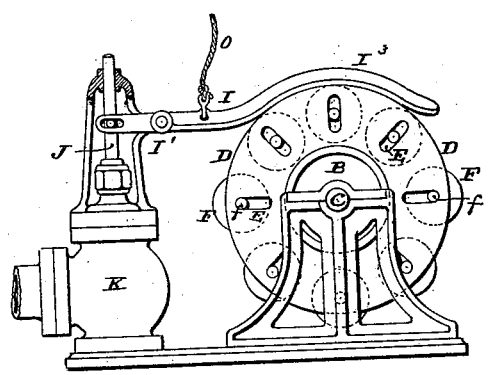
Figure 3:
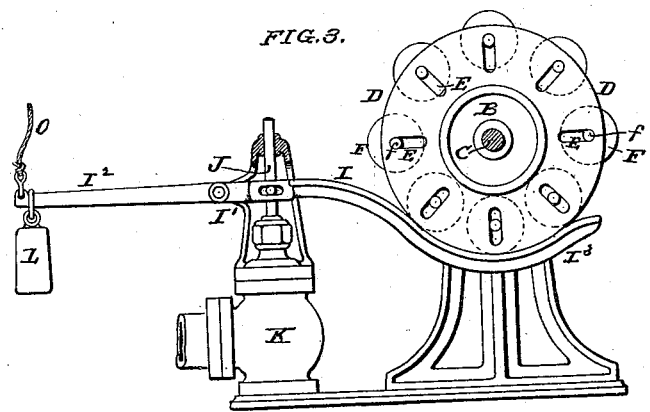

Figure 1 of the drawing is a side view of the apparatus, partly in section. Figs. 2 and 3 are side views of modified forms of the apparatus, partly in section.

A is the governor-belt, revolved by a pulley on the main shaft of the engine, or by any pulley turned by the engine, and the revolution of belt A gives rotation to the belt-pulley B on a shaft, C, which carries a head or wheel, D, consisting of two disks, with radial slots E giving bearing to the gudgeons *f* of the rollers F. The construction is such that the rollers have free radial and rotary motion as they revolve with the head D.

G is a standard, to which is attached the end of a belt, H, of leather, india-rubber, flexible metal, or other suitable flexible substance.

This belt extends beneath the rollers F, and its other end is attached to one end of the weighted lever I, to which the stem J of the governor-valve is connected. K is the case of the governor-valve.

The lever I is fulcrumed upon a bracket, $I^1$, and its end $I^2$ carries an adjustable weight, L, which tends to open the governor-valve. The centrifugal pressure of the rollers F upon the belt H, of course, tends to lift the weighted end $I^2$ of the lever I and close the governor-valve, so that an increase of speed in the rotation of the head D will cause the governor-valve to close, as in ordinary governors.

If it is desired that the mean speed of the engine should be increased, the weight L is moved farther from the lever-fulcrum at $I^1$, and this will increase the power of the weight to open the governor-valve in opposition to the centrifugal force of the rollers F, and consequently the speed of the engine will be increased in proportion to the distance of the weight L from the fulcrum.

M is an idler-pulley, which turns upon the governor-belt A, and has bearing upon the free end of a pivoted arm, N. It is sustained by the belt A, and should the belt A break or run off the pulleys, the idler-pulley M descends, and by means of a cord, O, attached to the free end of arm N, and the weighted end of lever I draws up the said weighted end $I^2$, and closes the governor-valve.

The cord, belt, or chain O passes over pulley or pulleys P, so as to put it into position for the required action.

As a modification of the described construction, I dispense with the belt H, and extend the end $I^3$ of the valve-stem lever I, as shown in Figs. 2 and 3, either above or beneath the head D, said head being located in a proper position for this purpose. The action of the rollers F directly upon the lever would be similar to that upon the belt H.

Instead of supporting the rollers F in slots E, they may be supported at the ends of pivoted arms, which swing outward by centrifugal force.

I claim—

1. The combination, with the governor-valve stem lever I, of the rotating head D, with rollers F, acting upon said lever by centrifugal force, substantially as and for the purpose set forth.

2. In a governor, the combination of lever I, belt H, rotating head or wheel D, and radially-movable rollers F, substantially as and for the purpose set forth.

3. In a governor, the combination of rotating head D with radially-movable weights or rollers F, belt H, weighted lever I, cord or chain O, and idler M N, substantially as set forth.

JOHN W. COLLET.

Witnesses:
SAML. KNIGHT,
ROBERT BURNS.